United States Patent
Sasaya et al.

(10) Patent No.: US 6,188,526 B1
(45) Date of Patent: Feb. 13, 2001

(54) VARIABLE FOCUS LENS DEVICE HAVING TEMPERATURE FLUCTUATION COMPENSATING FEATURE FOR LENS DEVICE LIQUID

(75) Inventors: Takanari Sasaya, Kariya; Takashi Kaneko, Nagoya; Nobuaki Kawahara, Nisshin, all of (JP)

(73) Assignee: Denso Corporation, Kariya (JP)

( * ) Notice: Under 35 U.S.C. 154(b), the term of this patent shall be extended for 0 days.

(21) Appl. No.: 09/344,333

(22) Filed: Jun. 25, 1999

(30) Foreign Application Priority Data

Jun. 26, 1998 (JP) .................................................. 10-180885
Apr. 14, 1999 (JP) .................................................. 11-106474

(51) Int. Cl.[7] ..................................................... G02B 1/06
(52) U.S. Cl. ........................................... 359/666; 359/665
(58) Field of Search .................................. 359/665, 666, 359/667, 820; 362/18, 19, 20

(56) References Cited

U.S. PATENT DOCUMENTS 5,438,486 * 8/1995 McNair ................................. 362/61

FOREIGN PATENT DOCUMENTS

| 1-140118 | 6/1989 | (JP) . |
| 8-114703 | 5/1996 | (JP) . |
| 9-230252 | 9/1997 | (JP) . |
| 10-144975 | 5/1998 | (JP) . |

\* cited by examiner

*Primary Examiner*—Ricky Mack
(74) *Attorney, Agent, or Firm*—Pillsbury Madison & Sutro LLP

(57) ABSTRACT

A variable focus lens device having a temperature compensation function whose construction is simple and which can be inexpensively manufactured. The device has a lens member including a lens container having a transparent elastic film, a transparent sealing member forming an internal volume, and a transparent liquid filling the internal volume, a stack-type piezoelectric actuator for varying the focus of the lens member by deforming the transparent elastic film by fluctuating the pressure inside the internal volume, and a tank connected to the internal volume by narrow passages. The tank and the narrow passages absorb temperature fluctuation components of the transparent liquid, which varies due to thermal expansion and contraction. The tank and the passages thereby form a temperature compensator, that, because the passages are narrow, does not react to sudden oscillating pressure components caused by the stack-type piezoelectric actuator.

25 Claims, 4 Drawing Sheets

VARIABLE FOCUS LENS DEVICE HAVING TEMPERATURE FLUCTUATION COMPENSATING FEATURE FOR LENS DEVICE LIQUID

CROSS-REFERENCE TO RELATED APPLICATIONS

The present application is related to, and claims priority from, Japanese Patent Application Nos. Hei. 10-180885 and Hei. 11-106174, the contents of which are incorporated herein by reference.

BACKGROUND OF THE INVENTION

1. Technical Field

This invention relates generally to variable focus lenses, and particularly to a variable focus lens device having a focal point adapted to cyclical high-speed fluctuation to deepen the device's depth of focus.

2. Discussion

A variable focus lens device having a lens member and a separate a pressuring part adjacent to the lens member is disclosed, for example, in Japanese Patent Application Laid-Open No. Hei. 8-114703.

In this variable focus lens device, a pair of pressure-measuring strain gauges and a pair of temperature-compensating strain gauges are joined to the transparent elastic film for measuring the pressure of a transparent liquid acting on a transparent elastic film and controlling the pressuring part so that this pressure approaches a target value. These pressure-measuring strain gauges and temperature-compensating strain gauges form a Wheatstone bridge circuit, and distortion of the transparent elastic film is measured on the basis of an output from this circuit. Because the focal length of the lens member lens is temperature-compensated during this measurement, if the same measured values are used to control a piezoelectric unimorph driving the pressuring part, volume fluctuations of the transparent liquid resulting from thermal expansion and contraction are also compensated.

However, this related art variable focus lens device has a complex structure because the Wheatstone bridge circuit must be formed by a pair of pressure-measuring strain gauges and a pair of temperature-compensating strain gauges. Also, because the strain gauges must be mounted at correct angles in correct positions to form the Wheatstone bridge circuit, manufacturing is difficult to automate and is therefore labor-intensive.

Nevertheless, with a variable focus lens device having a transparent liquid sealed in a closed container and not having a temperature compensation function, the focal length of the lens changes and the focus position moves when the transparent liquid thermally expands or thermally contracts due to an increase in temperature resulting from a change in the surrounding temperature or extended operation. That is, it is sometimes unavoidably necessary for the device to be provided with a temperature compensation function, because without temperature compensation precise focus positioning sometimes is difficult to obtain, depending on the environment in which a variable focus lens device is to be used and the purpose of that use.

SUMMARY OF THE INVENTION

It is therefore an object of the present invention to provide a variable focus lens device which has both a temperature compensation capability and a simple construction which can be manufactured inexpensively with little labor.

More particularly, the present invention comprises a variable focus lens device including a lens member with a lens container having a disc-shaped transparent elastic film, a transparent sealing member disposed facing the transparent elastic film across a predetermined gap forming an internal volume, and a transparent liquid filling the internal volume. An actuator varies a focal point of the lens member by deforming the transparent elastic film by fluctuating the pressure inside the internal volume.

Also, a temperature compensator, connected to the internal volume, absorbs a temperature fluctuation component of the transparent liquid, which varies due to thermal expansion and thermal contraction. The temperature compensator has a tank whose capacity is variable and a narrow passage that, while being connected to the internal volume, essentially does not function as a flow passage with respect to sudden pressure fluctuations caused by the actuator.

According to the present invention, even when the transparent liquid filling the internal volume of the lens container thermally expands or thermally contracts due to an increase in temperature resulting from a change in the surrounding temperature or from extended operation, the temperature fluctuation component of the transparent liquid is absorbed or supplied by the temperature compensator. As a result, even without a temperature compensation circuit such as a Wheatstone bridge circuit, changes in the focal length of the lens member caused by variations in the temperature of the transparent liquid are suppressed, and an effect similar to that of when temperature compensation is carried out is obtained.

Therefore, it is possible to provide an inexpensive variable focus lens device that includes a temperature compensation capability and that is simple in construction and does not require much labor to manufacture.

DETAILED DESCRIPTION OF THE PREFERRED EMBODIMENTS

Preferred embodiments of a variable focus lens device according to the invention will now be described in detail with reference to the accompanying drawings.

First Preferred Embodiment

Figure 1:
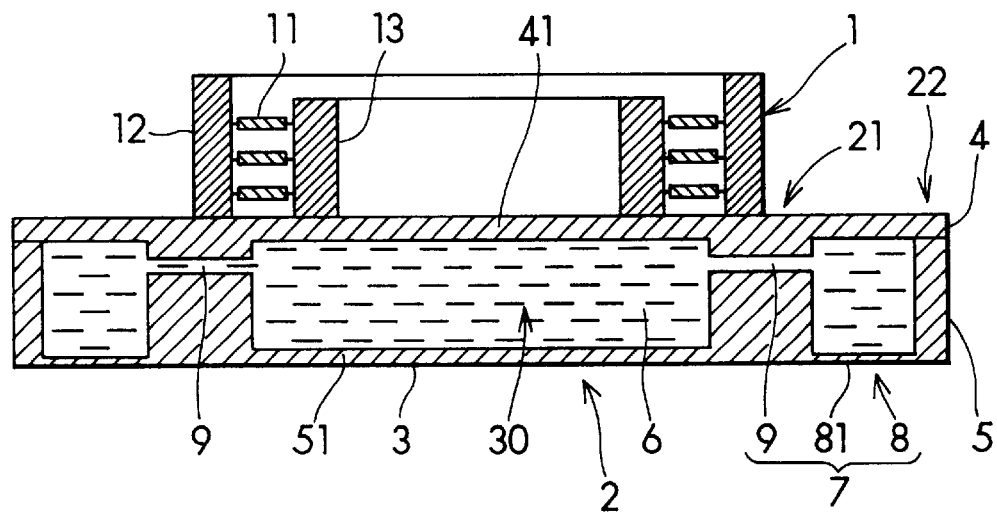
FIG. 1 is a sectional view showing the construction of a variable focus lens device according to a first preferred embodiment of the invention.

A first preferred embodiment of a variable focus lens device according to the invention, as shown in FIG. 1, is made up of a stack-type piezoelectric actuator 1, a lens member 2 driven by and thereby having its focal length changed by the stack-type piezoelectric actuator 1, and a temperature compensator 7 formed around the lens member 2. The variable focus lens device of this preferred embodiment is an extremely small and light device having a diameter on the order of about 1 to 2 cm.

The stack-type piezoelectric actuator 1 is made up of a plurality of annular piezoelectric bimorphs 11 stacked coaxially, an outer linking member 12 to which the outer edges of the piezoelectric bimorphs 11 are joined, and an inner linking member 13 to which the inner edges of the piezoelectric bimorphs 11 are joined. The outer linking member 12 and the inner linking member 13 are cylindrical members having different diameters, and are disposed coaxially with the annular piezoelectric bimorphs 11.

The inner edges of the piezoelectric bimorphs 11 are joined to the inner linking member 13 in a substantially moment-free fashion, with the object of increasing axial direction relative movement between the outer linking member 12 and the inner linking member 13, although the outer edges of the piezoelectric bimorphs 11 are joined to the outer linking member 12 rigidly. That is, whereas the outer edges of the piezoelectric bimorphs 11 are joined rigidly to the outer linking member 12 by laser welding, the inner edges of the piezoelectric bimorphs 11 are joined to the inner linking member 13 in an approximately moment-free fashion with a silicone rubber adhesive.

Therefore, because there is little displacement of the piezoelectric bimorphs 11 rigidly joined to the outer linking member 12, which is in turn fixed to a lens container 3 to be discussed hereinafter, it is possible for the stack-type piezoelectric actuator 1 to be operated at a higher speed. As a result, the response time of the variable focus lens device of this preferred embodiment can be decreased.

The stack-type piezoelectric actuator 1 causes the pressure inside an internal volume 30 of a lens container 3 filled with a transparent liquid 6 to fluctuate, and thereby deforms a disc-shaped transparent elastic film 51 of the lens container 3 to vary the focus of the lens member 2. The stack-type piezoelectric actuator 1 is driven by a drive power supply (not shown) and is suited to applications in which it causes the focus position of the lens member 2 to oscillate sinusoidally at a high speed of several tens of kHz or more.

The lens member 2 is made up of the above-mentioned lens container 3, which with the above-mentioned disc-shaped transparent elastic film 51 and a transparent sealing member 41 disposed facing the film across a predetermined gap, forms the above-mentioned internal volume 30, and the above-mentioned transparent liquid 6, with which the internal volume 30 is filled. So that it can cause axial displacement, the transparent sealing member 41 has an annular thin portion formed around the vicinity where the inner linking member 13 of the stack-type piezoelectric actuator 1 is joined thereto, and can deform elastically in this vicinity. The transparent elastic film 51, on the other hand, is made of an elastic glass film having suitable thicknesses continuously in concentric circles, and is designed using a stress analysis method such as a finite element method to undergo suitable deformation as a lens under the action of pressure fluctuations in the internal volume 30. The transparent liquid 6, specifically, is silicone oil.

The lens container 3 is constructed by a disc-shaped first member 4 made of borosilicate crown glass, and a disc-shaped second member 5 made of the same material, that are integrally and coaxially joined. The first member 4 has a rotationally symmetrical shape and the second member 5 also has a rotationally symmetrical shape except for narrow passages 9 formed therein. The first member 4 and the second member 5 are joined together at mutually opposing sides with an optical resin to form the lens container 3 and the temperature compensator 7.

The joints between the first member 4 and the second member 5 constituting the lens container 3 are an inner joint 21 and an outer joint 22 formed coaxially with the lens container 3. The internal volume 30 of the lens container 3 is formed on the inner side of the inner joint 21, and an annular tank 8 of the temperature compensator 7 is formed between the inner joint 21 and the outer joint 22. The above-mentioned narrow passages 9, which are multiple fine grooves formed radially in the joint face of the second member 5, are formed at the inner joint 21. The first member 4 and the second member 5 are not joined together only at parts corresponding to the narrow passages 9 in the inner joint 21.

The temperature compensator 7 connects with the internal volume 30 of the lens container 3 and has the function of absorbing temperature fluctuation components of the volume of the transparent liquid 6, which increases and decreases due to thermal expansion and thermal contraction. The temperature compensator 7 is made up of the above-mentioned tank 8, which has a variable capacity, and the narrow passages 9, which, while connecting with the tank 8 and the internal volume 30 of the lens container 3, essentially do not function as flow passages with respect to sudden pressure fluctuations induced by the stack-type piezoelectric actuator 1.

The tank 8 is an annular cavity formed around the lens container 3, coaxially and integrally therewith, where the first member 4 and the second member 5 form a cross-sectionally rectangular interior space between the inner joint 21 and the outer joint 22. A wall of the tank 8 forming part of an obverse face of the second member 5 is formed thinner than the transparent elastic film 51 so as to constitute an easily deformable annular elastic wall 81. Consequently, the interior space 30 of the tank 8 has, over a predetermined range, a variable capacity.

The narrow passages 9 are multiple fine grooves formed radially in the joint face of the second member 5, as mentioned above, and the openings at both ends of the narrow passages 9 have the same cutoff shape. Consequently, in the narrow passages 9, the passage resistance of when the transparent liquid 6 flows in one direction is the same as the passage resistance of when the transparent liquid 6 flows in the other direction.

As a result of being constructed as described above, the variable focus lens device of this preferred embodiment has the following three general effects.

The first of these effects is that, although its construction is simple and inexpensive, the device has an effective temperature compensation function.

First, a case wherein a sine-wave impressed voltage of the order of a several tens of kHz is applied to the stack-type piezoelectric actuator 1 and the lens member 2 is oscillated by the actuator 1 when the transparent liquid 6 is at a proper temperature and therefore temperature correction is not necessary will be considered.

Figure 2:
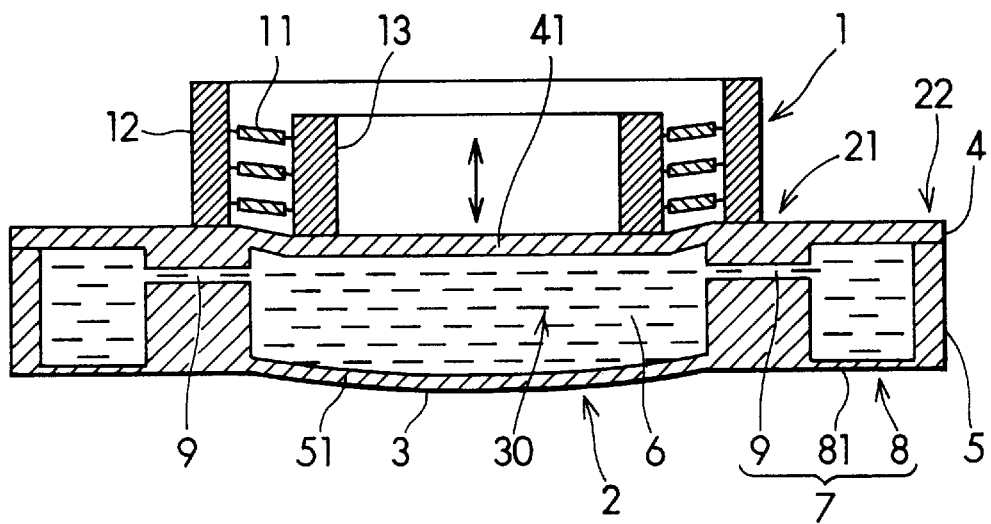
FIG. 2 is a sectional view illustrating a variable focus action of the variable focus lens device of the first preferred embodiment.

In this case, as shown in FIG. 2, the instant the transparent sealing member 41 is pushed by the end of the inner linking member 13 of the stack-type piezoelectric actuator 1, the transparent liquid 6 is pressurized and its pressure jumps because the transparent sealing member 41 displaces and the capacity of the internal volume 30 decreases. Because the narrow passages 9 do not function as flow passages with respect to instantaneous pressure fluctuations, the pressure only rises in the internal volume 30 of the lens container 3, and the transparent elastic film 51 is pushed out and forms a convex lens. Conversely, when the transparent sealing member 41 is pulled up by the stack-type piezoelectric actuator 1, the internal pressure of the lens container 3 drops, and the transparent elastic film 51 is sucked in, whereby a concave lens is formed.

In other words, because the pressure of the transparent liquid 6 in the internal volume 30 continues to fluctuate suddenly, with the no-load pressure as a mean, there is almost no exchange of the transparent liquid 6 between the internal volume 30 of the lens container 3 and the interior tank space through the narrow passages 9.

More specifically, the quantity of the transparent liquid 6 exchanged through the narrow passages 9 is minute, and the quantity of the transparent liquid 6 exchanged is the same in both directions, as mentioned above. As a result, there is no drifting of the mean value or the center value of the lens focal length of the lens member 2 due to lens member oscillation due to the stack-type piezoelectric actuator 1. Thus, because drifting of the lens focal length of the lens member 2 is prevented as long as an impressed voltage having a positive/negative-symmetrical waveform is being applied to the stack-type piezoelectric actuator 1, the variable focus lens device of this preferred embodiment can be used continuously.

Next, a case wherein the temperature of the transparent liquid 6 in the lens container 3 and the tank 8 has risen as a result of a change in the surrounding temperature environment or continuous use will be considered. In this case, assuming that the expansion coefficient of the transparent liquid 6 is higher than that of the first member 4 and the second member 5, since thermal expansion of the transparent liquid 6 causes the volume of the transparent liquid 6 to slowly increase, the narrow passages 9 act as flow passages.

Figure 3:
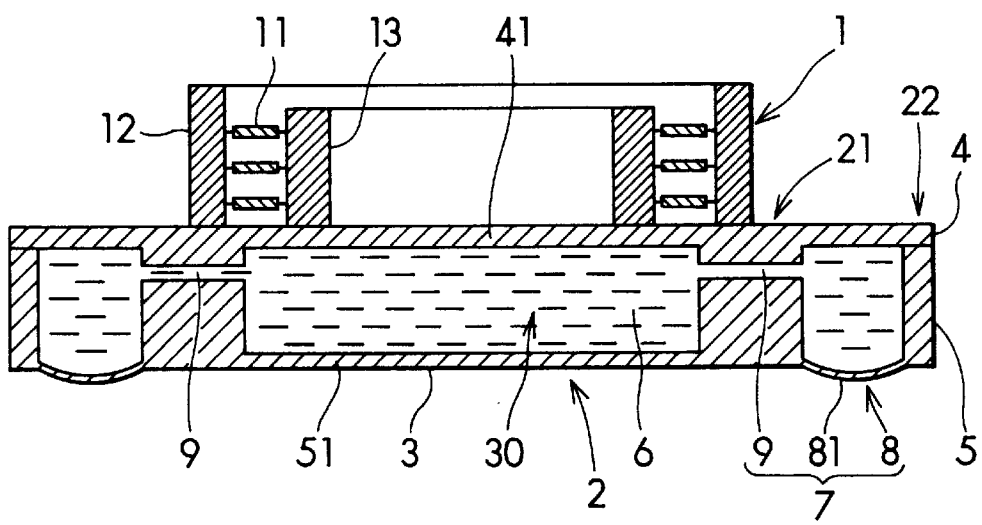
FIG. 3 is a sectional view illustrating a temperature compensation function of the variable focus lens device of the first preferred embodiment.

As a result, because the pressure of the transparent liquid 6 in the tank 8 becomes equal to the pressure of the transparent liquid 6 in the lens container 3, and the pressure acting on the elastic wall 81 from inside rises, the elastic wall 81 deforms convexly as shown in FIG. 3, and the internal volume of the tank 8 increases. As a result, the increase in the volume of the transparent liquid 6 caused by the thermal expansion is absorbed by the tank 8, and the pressure of the internal volume 30 of the lens container 3 does not fluctuate substantially. Therefore, because the lens container 3 does not deform substantially as a result of the thermal expansion of the transparent liquid 6, a temperature-compensating action is obtained.

Conversely, when the temperature of the transparent liquid 6 drops below the proper temperature and the transparent liquid 6 thermally contracts, some of the transparent liquid 6 is supplied through the narrow passages 9 from the tank 8 into the internal volume 30 of the lens container 3 where the pressure is tending to fall. That is, as a result of the internal pressure of the tank 8 falling slightly, the elastic wall 81 of the tank 8 deflects convexly inward, the internal volume of the tank 8 decreases, and consequently some of the transparent liquid 6 is supplied from the tank 8 into the internal volume 30 of the lens container 3. As a result, because there is almost no pressure fluctuation of the transparent liquid 6 in the lens container 3, there is also almost no change in the focal length of the lens formed by the lens member 2.

Therefore, in the variable focus lens device of this preferred embodiment, the temperature fluctuation component of the volume of the transparent liquid 6 is absorbed by the temperature compensator 7, even when due to a temperature rise caused by a change in the surrounding temperature or by prolonged operation the transparent liquid 6 contained in the internal volume 30 of the lens container 3 thermally expands or thermally contracts. Specifically, the internal volume of the tank 8 fluctuates as a result of the elastic wall 81 deforming, and as a result absorbs volume fluctuations due to thermal expansion and contraction of the transparent liquid 6. Thus, even without a temperature compensation circuit such as a Wheatstone bridge using temperature compensation strain gauges being provided, variations of the focal length of the lens container 3 caused by temperature changes are suppressed, and thus a temperature-compensating action is obtained. That is, without a complicated compensating device such as a temperature compensation circuit, by action of the temperature compensator 7, which is simply constructed and requires relatively little manufacturing labor, the variable focus lens device is provided with a temperature compensation function.

Also, because the variable focus lens device according to the invention has a compact and rotationally symmetrical external shape, not only does it have an attractive external appearance but it also has an increased range of possible applications.

That is, in the variable focus lens device of this preferred embodiment, because the tank 8 is an annular hollow part coaxially formed around the lens container 3 and is integral therewith, the associated manufacturing process is simplified and the lens member 2 is formed in a compact disc shape. Also, because the stack-type piezoelectric actuator 1 is disposed coaxially with the lens container 3, it is possible for the entire variable focus lens device to be constructed in an axially symmetrical shape. As a result, the variable focus lens device can be constructed compactly in a rotationally symmetrical shape. In addition, not only does it have an attractive and refined external appearance, but also it can be applied to a wider range of applications.

In addition, when the focal length of the lens member 2 is varied at a high speed while a temperature compensation function is operating as described above, the focal length can be varied with certainty by an amount corresponding to the stroke of the stack-type piezoelectric actuator 1. The reason for this is that the narrow passages 9 connecting the internal volume 30 and the tank 8 of the lens member 2 are narrow, and essentially do not function as flow passages with respect to sudden pressure variations in the internal volume 30. Consequently, the transparent liquid 6 in the internal volume 30 does not flow substantially between the internal volume 30 and the tank 8.

To illustrate this, the diameter of the moving part of the transparent sealing member 41 will be expressed as $d_0$, the narrow passages 9 will be assumed to be cross-sectionally circular and their internal diameter expressed as d and their length as L, and the flow speed of the transparent liquid 6 in the narrow passages 9 will be expressed as v and its coefficient of viscosity as $\mu$. Then, because the transparent liquid 6 flowing through the short and narrow passages 9 undergoes laminar flow, the pressure loss p due to conduit resistance of the narrow passages 9 can be approximated using the following equation Exp. 1.

$$p = 34(1/d)^4 L \mu d_0^2 v \qquad \text{(Exp. 1)}$$

Conversely, the flow speed v in the narrow passages 9 resulting from a pressure difference p arising between the internal volume 30 and the tank 8 due to the operation of the stack-type piezoelectric actuator 1 is given by the following equation Exp. 2, and the volume flow V can be calculated using the following equation Exp. 3.

$$v = p/\{34(1/d)^4 L_f \mu d_0^2\} \quad \text{(Exp. 2)}$$

$$V = v d^2/4 = p d^2/4\{34(1/d)^4 L_f \mu d_0^2\} \quad \text{(Exp. 3)}$$

The volume of the transparent liquid 6 flowing out of the internal volume 30 of the lens member 2 into the tank 8 is calculated as the integral with respect to time of the volume flow V. However, because the frequency at which the stack-type piezoelectric actuator 1 is driven is for example 60 Hz or several hundred Hertz, and furthermore the stack-type piezoelectric actuator 1 is operated equally in positive and negative directions, even over a long time the flowout volume remains at substantially zero. Also, even after fluctuations over time of the flowout volume, because the time for which the transparent liquid 6 flows in one direction is very short, fluctuation in the volume of the transparent liquid 6 in the internal volume 30 is almost nil.

Therefore, while a temperature compensation function is obtained, when the focal length of the lens member 2 is oscillated at a high speed, variation of focal length certainly corresponding to the operation of the stack-type piezoelectric actuator 1 only is obtained. This is extremely useful in technology wherein as disclosed in Japanese Unexamined Patent Publication No. Hei. 9-230252 submitted by the present applicant the afterimage phenomenon of sight is utilized to create the appearance that the focus takes in the whole of an observed object.

As a modified version of the first preferred embodiment, an embodiment of the variable focus lens device having a construction wherein the transparent sealing member 41 includes a second transparent elastic film is possible.

In this modified version, because the transparent sealing member 41 is made up of a second transparent elastic film and two transparent elastic films 41, 51 then face each other, compared to the construction of the first preferred embodiment, which has only the single transparent elastic film 51, the variation of the lens focal length can be doubled.

Therefore, with this modified version, it is possible to obtain a larger lens focal length variation, i.e. a larger distance of movement of the focal position.

Modified versions equivalent to this modified version can also be applied with respect to the other preferred embodiments described hereinafter, and the same effects as those of this modified version can be obtained.

As a second modified version of the present preferred embodiment, embodiments having various different constructions of the stack-type piezoelectric actuator 1 can be realized.

First, a modified version using a stack-type piezoelectric actuator wherein in the reverse of the stack-type piezoelectric actuator 1 of the present preferred embodiment the inner edges of the piezoelectric bimorphs 11 are rigidly joined to the inner linking member 13 and the outer edges of the piezoelectric bimorphs 11 are joined to the outer linking member 12 in an approximately moment-free fashion can be realized. With this modified version, although the response time becomes slightly longer than that of a variable focus lens device wherein the stack-type piezoelectric actuator 1 of the first preferred embodiment described above is utilized, effects similar to those of the first preferred embodiment can be obtained.

In this modified version, a stack-type piezoelectric actuator having a construction wherein, instead of the cylindrical outer linking member 12, multiple barlike outer linking members are joined to the outer edges of the piezoelectric bimorphs 11 can also be utilized. With this modified version, because air can flow between the stacked piezoelectric bimorphs 11, cooling of the piezoelectric bimorphs 11 is improved, and overheating of the piezoelectric bimorphs 11 is prevented even when the device is operated continuously for long periods.

Versions equivalent to this modified version can also be worked with respect to the other preferred embodiments described hereinafter, and the same effects as those of this modified version can be obtained.

Second Preferred Embodiment

Figure 4:
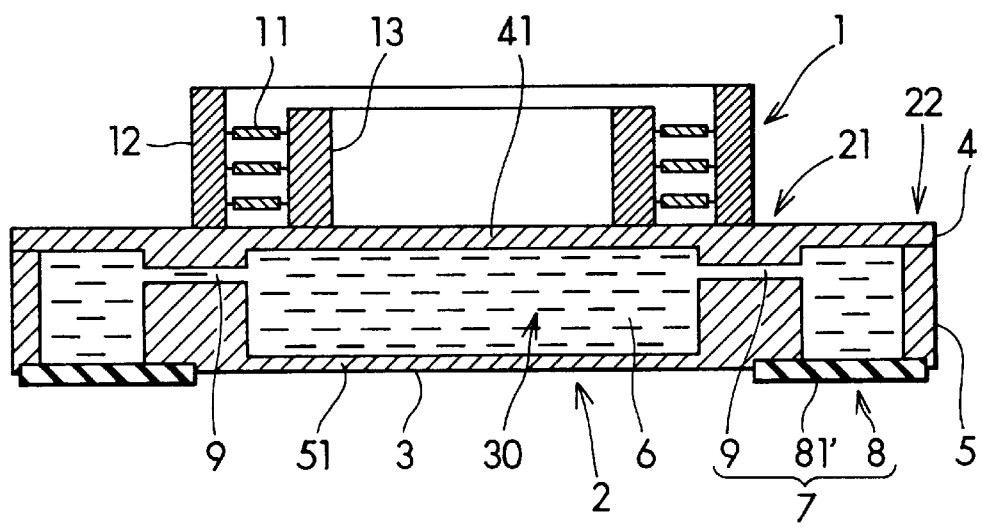
FIG. 4 is a sectional view showing the construction of a variable focus lens device according to a second preferred embodiment.

A second preferred embodiment of a variable focus lens device according to the present invention, as shown in FIG. 4, differs from the first preferred embodiment in that the annular wall of the tank 8 has in its annular region facing downward an easily deformable rubber elastic wall 81'. Together with this, the second member 5 is a smaller-diameter member having the inner joint 21 at its outer periphery. The first member 4 is also changed to a somewhat larger member including the outer circumferential wall of the tank 8. Otherwise, the variable focus lens device of this preferred embodiment has substantially the same construction as the first preferred embodiment.

The annular lower (in FIG. 4) end face of the outer circumferential wall of the first member 4 and the lower face of the second member 5 are in the same plane. The elastic wall 81', which is an annular thin rubber plate shaped like a flat washer, is adhered to the lower faces of the members 4, 5 to cover the lower (in the figure) side of the annular channel-shaped space inside the tank 8 formed between the members 4, 5. So that it is not invaded by the silicone oil that is the transparent liquid 6, the elastic wall 81' is made of for example silicone rubber, and the adhesive adhering the elastic wall 81' to the members 4, 5 is a silicone rubber adhesive.

In the variable focus lens device of this preferred embodiment, because the elastic wall 81' does not form a curved outer circumferential wall and instead is a bottom wall member having no curvature, the pressure of the transparent liquid 6 in the tank 8 is not influenced by the strength/weakness of the rubber elasticity of the elastic wall 81'. Also, unlike an elastic wall 81 consisting of a thin glass sheet as in the first preferred embodiment, problems such as the wall breaking easily under outside forces are avoided. And because the rubber elastic wall 81' deforms much more than the elastic wall 81 of the first preferred embodiment, it can absorb greater volume fluctuations of the transparent liquid 6 resulting from thermal expansion and contraction. Conversely, for the same volume fluctuation of the transparent liquid 6 resulting from thermal expansion and contraction, the width of the annular channel forming the inside of the tank 8 can be made narrower, and the external shape of the lens member 2 thereby made smaller.

Therefore, with the variable focus lens device of this preferred embodiment, while it is more durable and easier to manufacture than the first preferred embodiment, it can be constructed still more compactly than the first preferred embodiment.

Third Preferred Embodiment

Figure 5:
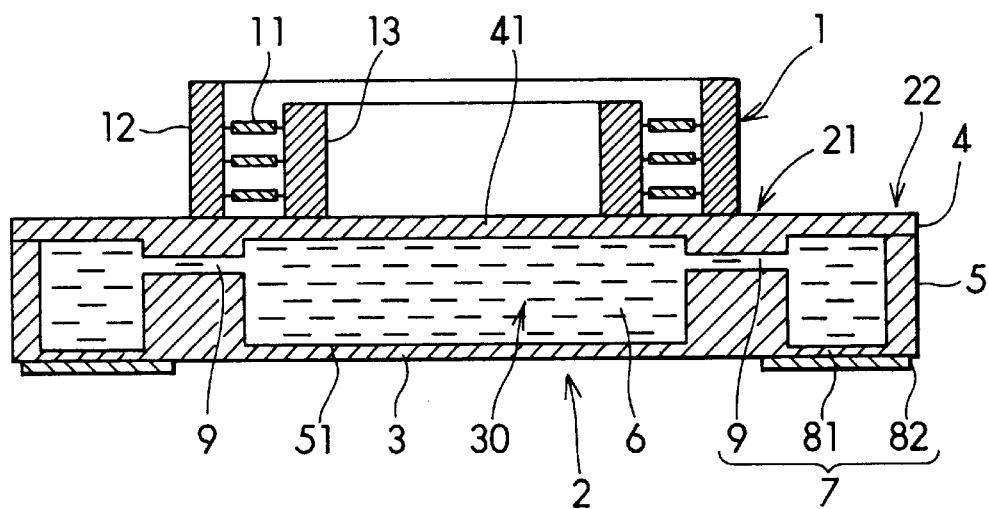
FIG. 5 is a sectional view showing the construction of a variable focus lens device according to a third preferred embodiment.

A third preferred embodiment of a variable focus lens device according to the invention has substantially the same construction as the first preferred embodiment. However, as shown in FIG. 5, a temperature-compensating plate 82 is joined by a thin adhesive layer of epoxy resin to the elastic wall 81 of the tank 8 from the outer side of the elastic wall 81. The temperature-compensating plate 82 is made of a metal such as, for example, zinc or aluminum. Because it has a linear expansion coefficient greater by as much as one order than the linear expansion coefficient of the glass elastic wall 81, the elastic wall 81 and the temperature-compensating plate 82 affixed together form a kind of bimetal.

In the variable focus lens device of this preferred embodiment, as described above, the tank 8 has a temperature-compensating plate 82 having a larger linear expansion coefficient than the linear expansion coefficient of the elastic wall 81 and joined to the elastic wall 81 from the outer side thereof. Consequently, the elastic wall 81 and the temperature-compensating plate 82 form a wall which flexes convexly or concavely according to its temperature like a bimetal.

That is, when the transparent liquid 6 inside the tank 8 increases in temperature and the temperatures of the elastic wall 81 and the temperature-compensating plate 82 consequently increase, the elastic wall 81 of the tank 8 and the temperature-compensating plate 82 distend convexly outward. As a result, the internal capacity of the tank 8 increases, and the tank 8 sucks some of the transparent liquid 6 from the internal volume 30 of the lens container 3. When the temperature of the elastic wall 81 and the temperature-compensating plate 82 decreases, because the elastic wall 81 of the tank 8 distends convexly inward, the internal capacity of the tank 8 decreases, and the tank 8 sends some of the transparent liquid 6 into the internal volume 30 of the lens container 3.

Therefore, by properly setting the linear expansion coefficient, the Young's modulus and the thickness of the elastic wall 81 and the temperature-compensating plate 82 respectively, it is possible to make tank capacity variations occur which are equivalent to the volume variations resulting from thermal expansion and contraction of the transparent liquid 6 in the internal volume 30. When this is done, volume variations of the transparent liquid 6 resulting from thermal expansion and thermal contraction are almost completely absorbed by variations in the internal volume of the tank 8 and thus can be effectively eliminated. As a result, the temperature compensation function becomes more complete.

Therefore, with the variable focus lens device of this embodiment, in addition to the effects of the first preferred embodiment, it is possible to design a variable focus lens device having a more complete temperature compensation function.

Fourth Preferred Embodiment

Figure 6:
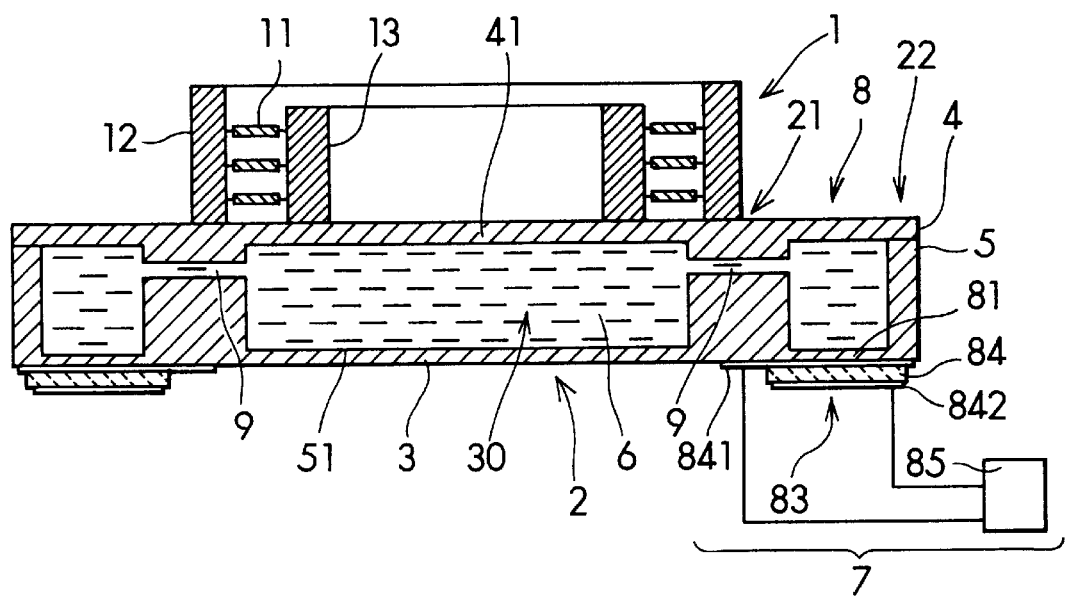
FIG. 6 is a sectional view showing the construction of a variable focus lens device according to a fourth preferred embodiment.

In a fourth preferred embodiment according to the invention, in addition to the construction of the first preferred embodiment, a piezoelectric plate 84 is joined to the elastic wall 81 of the tank 8, and a piezoelectric unimorph 83 is thereby formed on a part of the wall of the tank 8, as shown in FIG. 6. That is, the elastic wall 81 as an elastic plate, a first electrode 841 joined to the elastic wall 81, a piezoelectric plate 84 joined to the first electrode 84, and a second electrode 842 formed on the surface of the piezoelectric plate 84 make up an annular piezoelectric unimorph 83. Also, separately from the tank 8, a voltage control unit 85 for impressing a suitable voltage between the first electrode 841 and the second electrode 842 is provided, and the electrodes 841, 842 and the voltage control unit 85 are connected by extremely fine lead wires.

With the variable focus lens device of this preferred embodiment, because it has the piezoelectric unimorph 83 which constitutes a part of the wall of the tank 8, by adjusting the voltage impressed on the piezoelectric unimorph 83, it is possible to freely change the internal volume of the tank 8 over a predetermined range. That is, by causing the piezoelectric unimorph 83 to flex convexly or concavely, it is possible to change the internal volume, i.e. the capacity, of the tank 8. Therefore, if it is possible to measure or estimate any volume change of the transparent liquid 6 resulting from thermal expansion and contraction, by correctly adjusting the capacity of the tank 8, it becomes possible to absorb the volume change of the transparent liquid 6 with the tank 8.

Here, to measure volume changes of the transparent liquid 6, a temperature sensor disposed in the lens container 3 or its internal volume 30, or a pressure sensor disposed in the lens container 3 or the tank 8, can be employed. A device to measure volume changes of the transparent liquid 6, on the other hand, may estimate volume changes by monitoring movements of the focus position of the lens in real time while the device is operating, or may estimate volume changes from past movements of the focus position while the device is operating, or from a temperature history of the transparent liquid.

With the variable focus lens device of this preferred embodiment it is also possible for the voltage impressed on the piezoelectric unimorph 83 to be adjusted by a control operation, and the focus position thereby actively changed while the device is operating.

Thus, with the variable focus lens device of this preferred embodiment, in addition to the effects of the first preferred embodiment, a more complete temperature compensation function is realized, and it is also possible for the focus position to be adjusted actively by a control operation.

Fifth Preferred Embodiment

Figure 7:
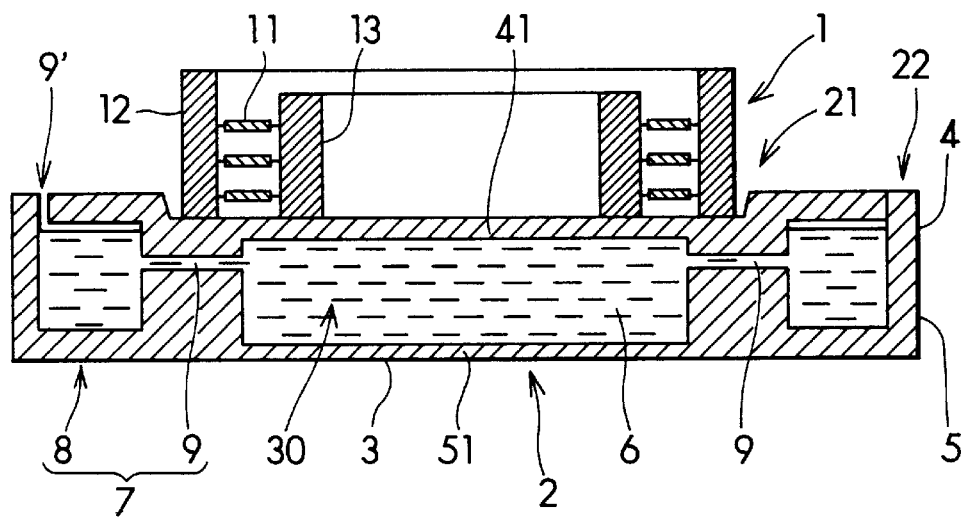
FIG. 7 is a sectional view showing the construction of a variable focus lens device according to a fifth preferred embodiment.

In a fifth preferred embodiment of a variable focus lens device according to the invention, as shown in FIG. 7, the tank 8 has a ventilation hole 9' opening at a position in the tank 8 higher than the openings of the narrow passages 9 and connecting with an outside space. In the variable focus lens device of this preferred embodiment, unlike the preferred embodiments described above, the walls of the tank 8 are all rigid, and the capacity of the tank 8 is not variable. Otherwise, the variable focus lens device of this preferred embodiment has substantially the same construction as the first preferred embodiment.

The ventilation hole 9' is formed as a groove in a part of the outer circumferential face of the first member 4, and may be formed in one location or in a plurality of neighboring locations.

In the variable focus lens device of this preferred embodiment, the tank 8 has a ventilation hole 9' opening at a position higher than the openings of the narrow passages 9 and connecting with an outside space. Therefore, if the surface level of the transparent liquid 6 in the tank 8 is set to between the openings of the narrow passages 9 and the opening of the ventilation hole 9', the internal pressure of the tank 8 is always kept at the same pressure as the outside space by the ventilation hole 9' connecting with the outside space. As a result, the steady-state liquid pressure in the internal volume 30 of the lens container 3 settles to the pressure of the outside space.

Therefore, with the variable focus lens device of this preferred embodiment, in addition to the effects of the first preferred embodiment, while the device is extremely simple and easy to manufacture, a still more complete temperature compensation function is exhibited.

If the opening of the ventilation hole 9' at the inside of the tank 8 is formed in a position sufficiently higher than the openings of the narrow passages 9 in the tank 8, problems of the transparent liquid 6 overflowing through the ventilation hole 9' due to volume fluctuations of the transparent liquid 6 resulting from thermal expansion and thermal contraction are prevented.

Also, in the variable focus lens device of this preferred embodiment, because the ventilation hole 9' is either a single hole or a plurality of neighboring holes, when the variable focus lens device is to be used at an angle it is possible for the device to be inclined so that the ventilation hole 9' is kept up. Therefore, although because in the variable focus lens device of this preferred embodiment the tank 8 is not sealed, as it is in the previous preferred embodiments, although it cannot be used in any attitude, it can be used in a considerably wide range of attitudes by the ventilation hole 9' being thus kept up.

Sixth Preferred Embodiment

Figure 8:
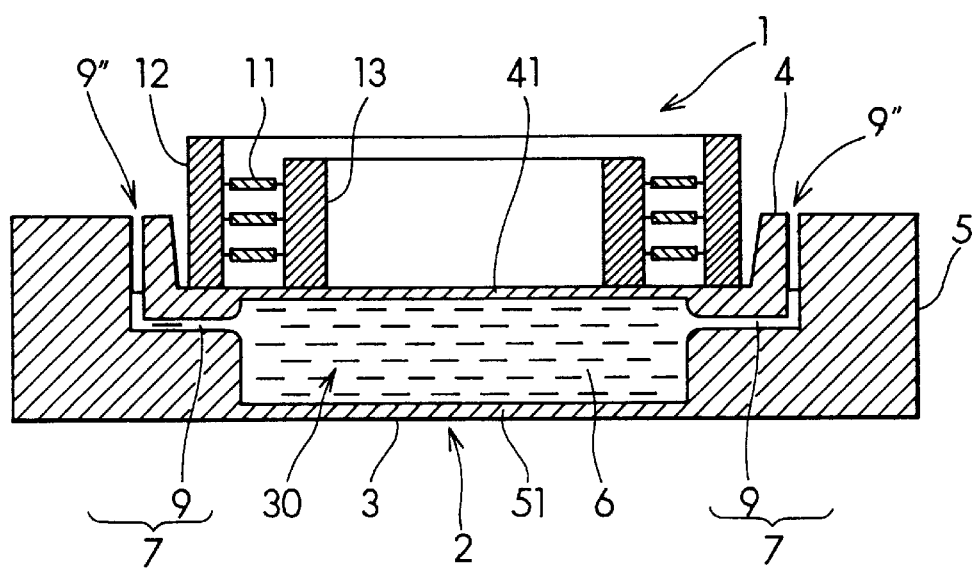
FIG. 8 is a sectional view showing the construction of a variable focus lens device according to a sixth preferred embodiment.

A sixth preferred embodiment of a variable focus lens device according to the invention, as shown in FIG. 8, does not have a tank 8. Instead, the internal volume 30 of the lens container 3 is connected to an outside space by way of narrow passages 9 and ventilation holes 9" having outside openings connected together. Otherwise, the embodiment has substantially the same construction as the first preferred embodiment.

Because in the variable focus lens device of this preferred embodiment the internal volume 30 of the lens container 3 is directly connected to an outside space by the narrow passages 9 and ventilation holes 9", the same effects as those of the fifth preferred embodiment described above are obtained.

However, because unlike the fifth preferred embodiment this device does not have a tank 8, when thermal expansion of the transparent liquid 6 is too great or the stack-type piezoelectric actuator 1 drives the transparent sealing member 41 of the lens container 3 continuously, there is a risk of the transparent liquid 6 overflowing to the outside. To prevent the transparent liquid 6 from overflowing, a joining member for joining a funnel-shaped saucer to the outside openings of the ventilation holes 9" is effective.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A variable focus lens device comprising:
    a lens member including a lens container having a disc-shaped transparent elastic film, a transparent sealing member facing the transparent elastic film and disposed across a predetermined gap to define an internal volume therebetween, and a transparent liquid filling the internal volume;
    an actuator for varying a focus of the lens member by deforming the transparent elastic film through varying a pressure inside the internal volume; and
    a temperature compensator, in communication with the internal volume, for absorbing a temperature variation component of the transparent liquid that varies due to thermal expansion and contraction,
    wherein the temperature compensator includes a variable capacity tank, and a narrow passage that, while in communication with the internal volume, restricts flow of the transparent liquid during sudden actuator-initiated liquid pressure fluctuations.

2. The variable focus lens device of claim 1, wherein the tank has a wall including at least a portion thereof that is elastically deformable to compensate for temperature fluctuations in the transparent liquid.

3. The variable focus lens device of claim 2, wherein the tank includes a temperature-compensating plate externally joined to the elastically deformable wall and having a larger linear expansion coefficient than that of the elastically deformable wall for adjusting the internal volume to compensate for temperature fluctuations in the transparent liquid.

4. The variable focus lens device of claim 1, wherein the tank has a piezoelectric unimorph forming at least a part of a wall thereof for adjusting the internal volume to compensate for temperature fluctuations in the transparent fluid.

5. The variable focus lens device of claim 1, wherein the tank has a ventilation hole opening at a position in the tank higher than an opening of the narrow passage, the ventilation hole being in communication with an outside space.

6. The variable focus lens device of claim 1, wherein the tank defines an annular hollow part formed around the lens container coaxially and integrally therewith.

7. The variable focus lens device of claim 6, wherein the lens member is disc-shaped, and the actuator is a stack-type actuator disposed coaxially with the lens container,
    the variable focus lens device thereby being axially symmetrical.

8. The variable focus lens device of claim 6, wherein the actuator is a piezoelectric stack-type actuator including a plurality of bimorphs having inner and outer edges, the inner edges being joined to an inner linking member in a substantially moment-free manner, and the outer edges being rigidly joined to an outer linking member.

9. The variable focus lens device of claim 8, wherein the outer linking member comprises a cylindrical outer linking member.

10. The variable focus lens device of claim 6, wherein the actuator is a piezoelectric stack-type actuator including a plurality of bimorphs having inner and outer edges, the inner edges being rigidly joined to an inner linking member, and the outer edges being joined to an outer linking member in a substantially moment-free manner.

11. The variable focus lens device of claim 1, wherein the narrow passage exhibits identical flow passage resistance to the transparent liquid regardless of transparent liquid flow direction.

12. The variable focus lens device of claim 1, wherein the transparent sealing member comprises first and second transparent elastic films.

13. A variable focus lens device comprising:
    a lens member including a lens container having a disc-shaped transparent elastic film, a transparent sealing member facing the transparent elastic film and disposed across a predetermined gap to define an internal volume therebetween, and a transparent liquid filling the internal volume;
    an actuator for varying a focus of the lens member by deforming the transparent elastic film through varying a pressure inside the internal volume; and
    a temperature compensator, in communication with the internal volume, for absorbing a temperature variation component of the transparent liquid that varies due to thermal expansion and contraction,
    wherein the temperature compensator includes a narrow passage in the lens container that, while in communication with the internal volume, restricts flow of the transparent liquid during sudden actuator-initiated liquid pressure fluctuations; a lens container ventilation hole; a liquid collector for collecting transparent liquid overflowing through the ventilation hole; and a joining member for communicating the liquid collector with the ventilation hole.

14. A temperature compensator for a variable focus lens device having a variable focus lens member defining an internal volume filled with a transparent liquid, the temperature compensator being in communication with the internal volume for absorbing a temperature variation component of the transparent liquid that varies due to thermal expansion and contraction, wherein the temperature compensator includes a variable capacity tank, and a narrow passage that, while in communication with the internal volume, restricts flow of the transparent liquid during sudden actuator-initiated liquid pressure fluctuations.

15. The temperature compensator of claim 14, wherein the tank has a wall including at least a portion thereof that is elastically deformable to compensate for temperature fluctuations in the transparent liquid.

16. The temperature compensator of claim 15, wherein the tank includes a temperature-compensating plate externally joined to the elastically-deformable wall and having a larger linear expansion coefficient than that of the elastically-deformable wall for adjusting the internal volume to compensate for temperature fluctuations in the transparent liquid.

17. The temperature compensator of claim 14, wherein the tank has a piezoelectric unimorph forming at least a part of a wall thereof for adjusting the internal volume to compensate for temperature fluctuations in the transparent fluid.

18. The temperature compensator of claim 14, wherein the tank has a ventilation hole opening at a position higher in the tank than an opening of the narrow passage, the ventilation hole being in communication with an outside space.

19. The temperature compensator of claim 14, wherein the tank defines an annular hollow part formed around the lens container coaxially and integrally therewith.

20. The temperature compensator of claim 19, wherein the lens member is disc-shaped, and the actuator is a stack-type actuator disposed coaxially with the lens container, the variable focus lens device thereby being axially symmetrical.

21. The temperature compensator of claim 19, wherein the actuator is a piezoelectric stack-type actuator including a plurality of bimorphs having inner and outer edges, the inner edges being joined to an inner linking member in a substantially moment-free manner, and the outer edges being rigidly joined to an outer linking member.

22. The temperature compensator of claim 21, wherein the outer linking member comprises a cylindrical outer linking member.

23. The temperature compensator of claim 19, wherein the actuator is a piezoelectric stack-type actuator including a plurality of bimorphs having inner and outer edges, the inner edges being rigidly joined to an inner linking member, and the outer edges being joined to an outer linking member in a substantially moment-free manner.

24. The temperature compensator of claim 14, wherein the narrow passage exhibits identical flow passage resistance to the transparent liquid regardless of transparent liquid flow direction.

25. The temperature compensator of claim 14, wherein the transparent sealing member comprises first and second transparent elastic films.

* * * * *